Figure 1:
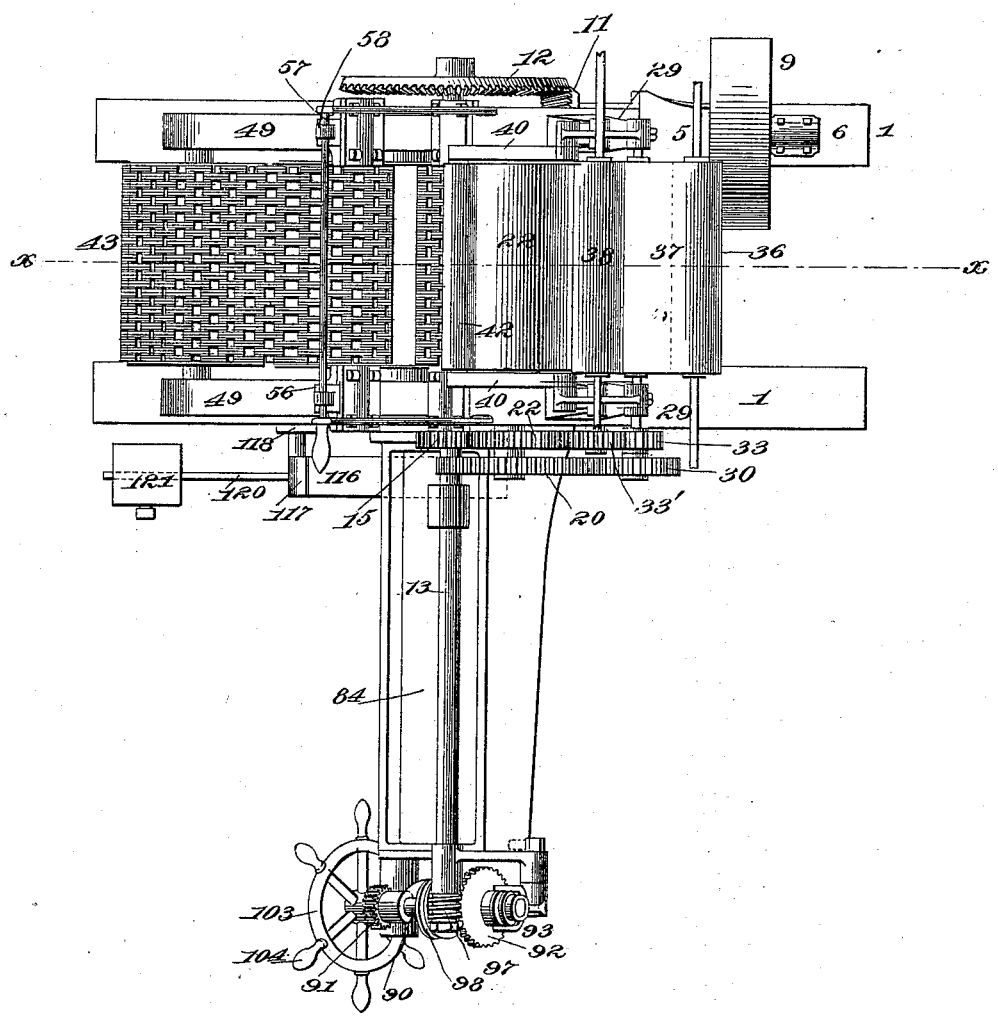

No. 648,372. Patented May 1, 1900.
W. E. ANDERSON.
BALING PRESS.
(Application filed July 12, 1895.)

(No Model.) 8 Sheets—Sheet 1.

Witnesses.

Inventor
William E. Anderson
by Frank L. Hyer,
Att'y.

No. 648,372. Patented May 1, 1900.
W. E. ANDERSON.
BALING PRESS.
(Application filed July 12, 1895.)
(No Model.) 8 Sheets—Sheet 2.

Witnesses:
J. P. Coleman
Archie G. Rue

Inventor
William E. Anderson
by Francis L. Dyer
Atty

No. 648,372. Patented May 1, 1900.
W. E. ANDERSON.
BALING PRESS.
(Application filed July 12, 1895.)
(No Model.) 8 Sheets—Sheet 3.
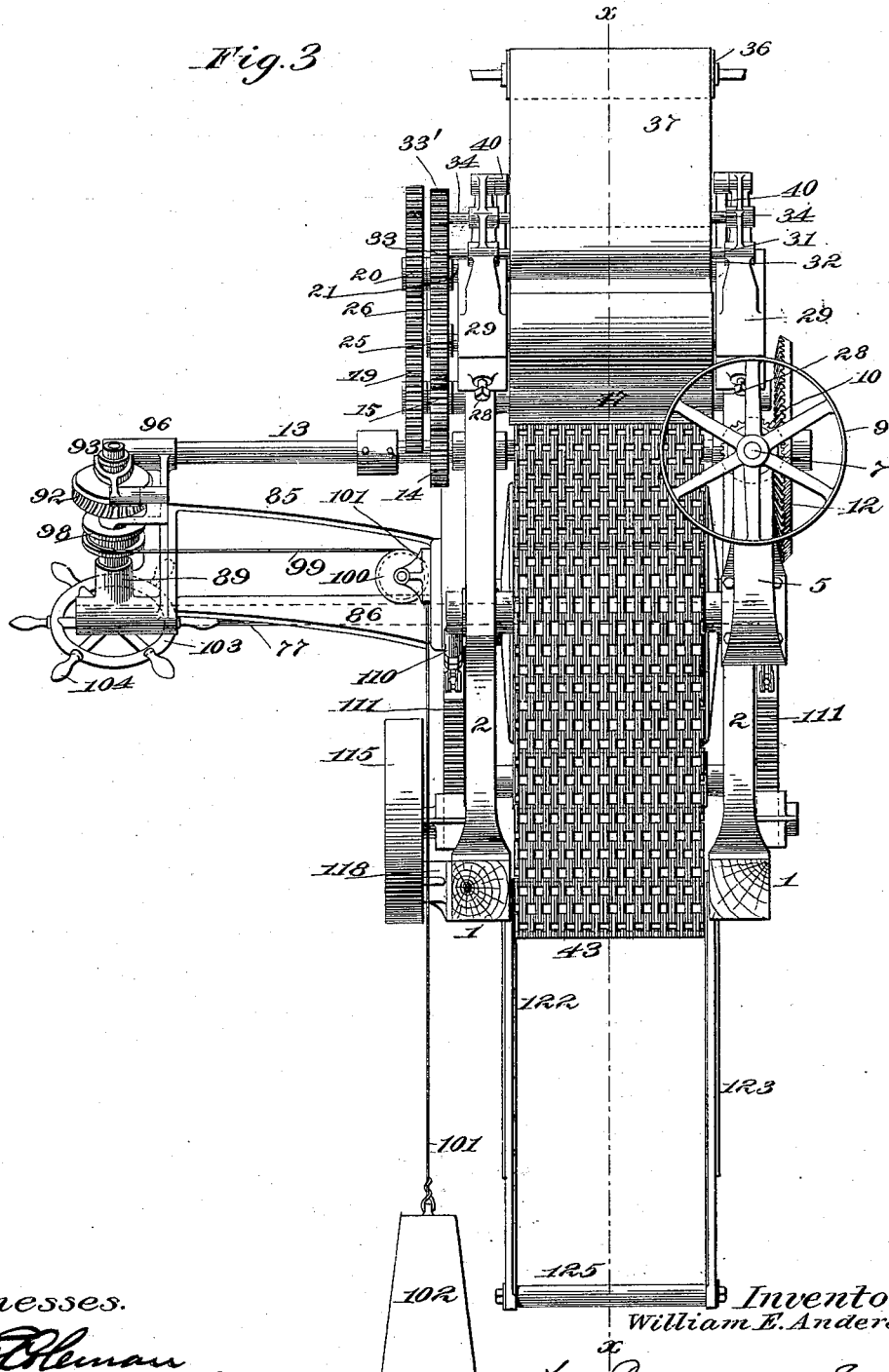
Witnesses. Inventor
William E. Anderson
by Frank L. Ayer
Atty.

No. 648,372. W. E. ANDERSON. Patented May 1, 1900.
BALING PRESS.
(Application filed July 12, 1895.)
(No Model.) 8 Sheets—Sheet 4.
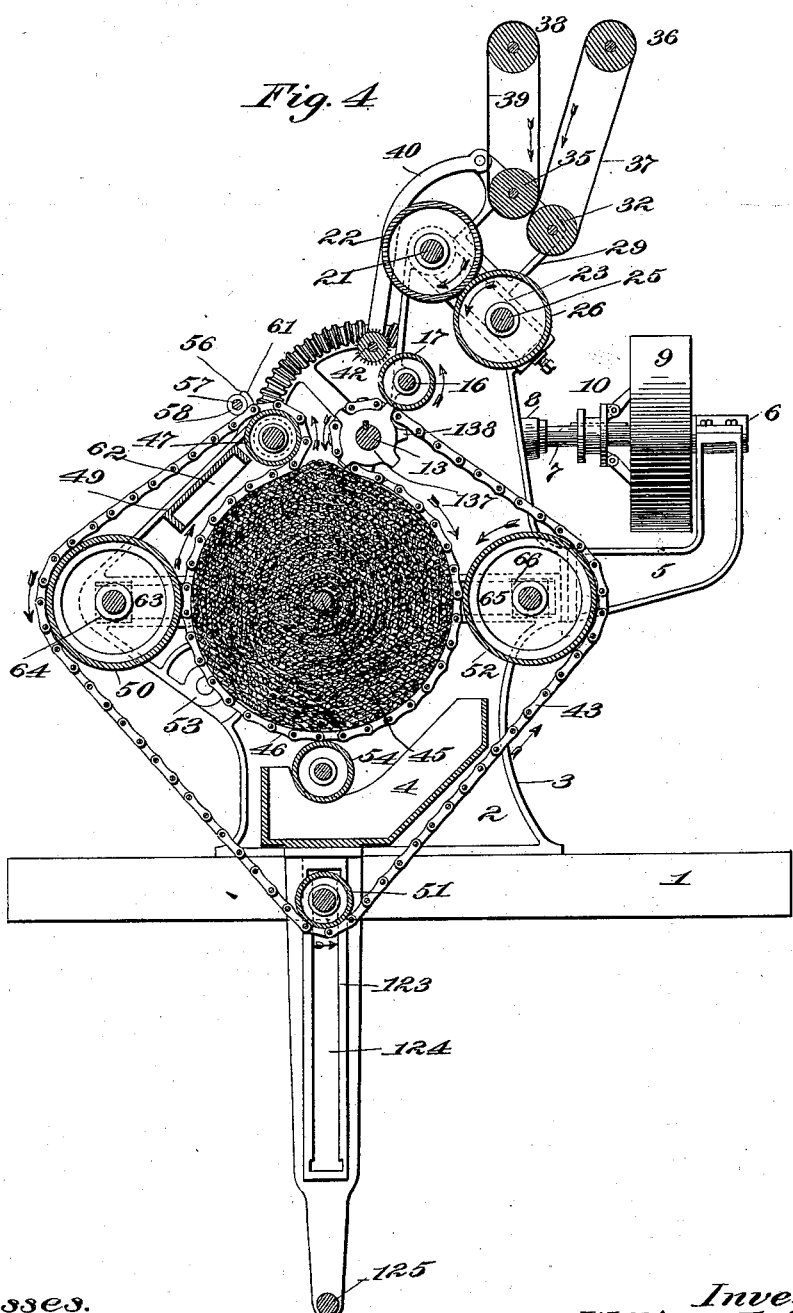
Witnesses.
Inventor
William E. Anderson

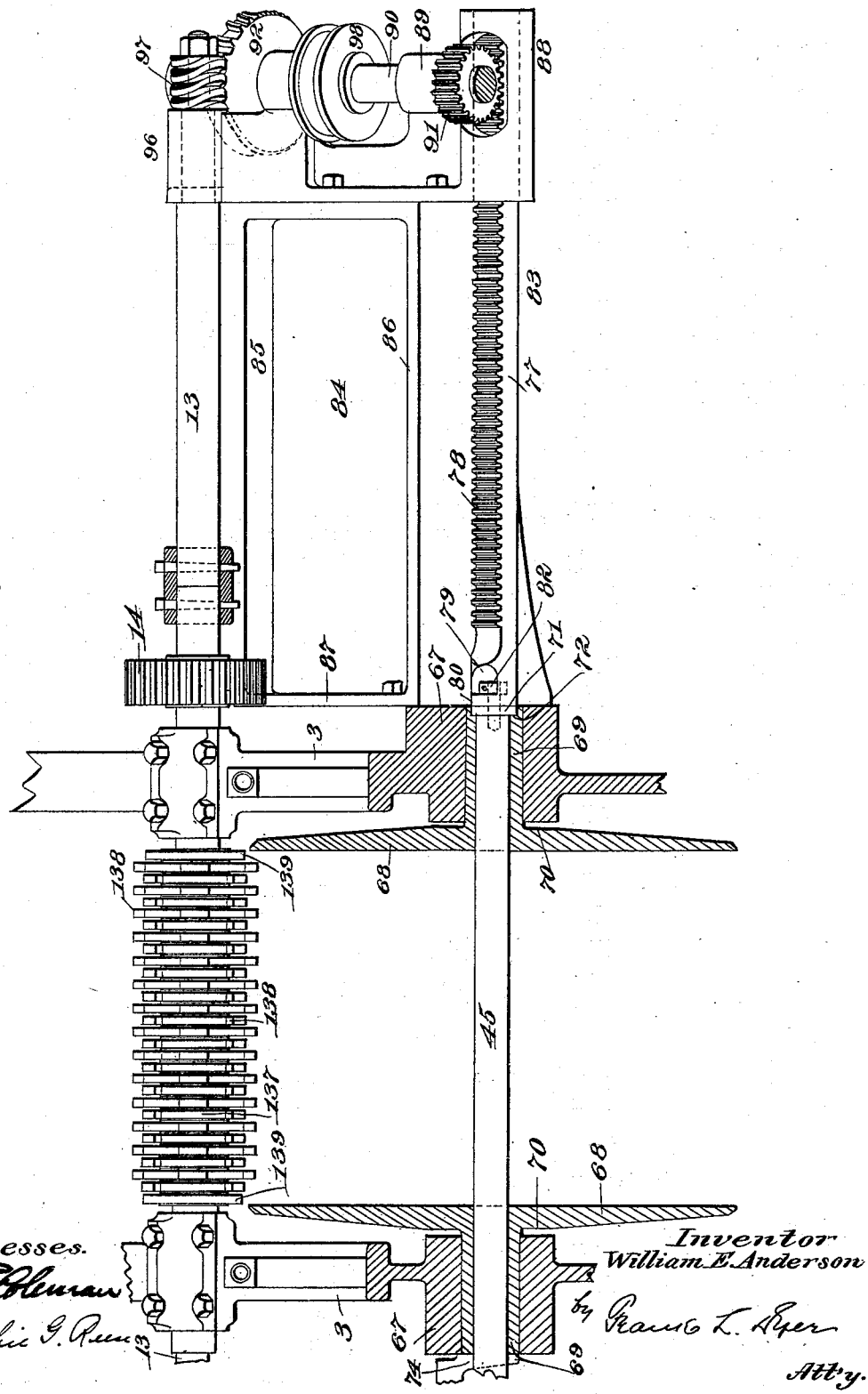

No. 648,372. Patented May 1, 1900.
W. E. ANDERSON.
BALING PRESS.
(Application filed July 12, 1895.)
(No Model.) 8 Sheets—Sheet 6.
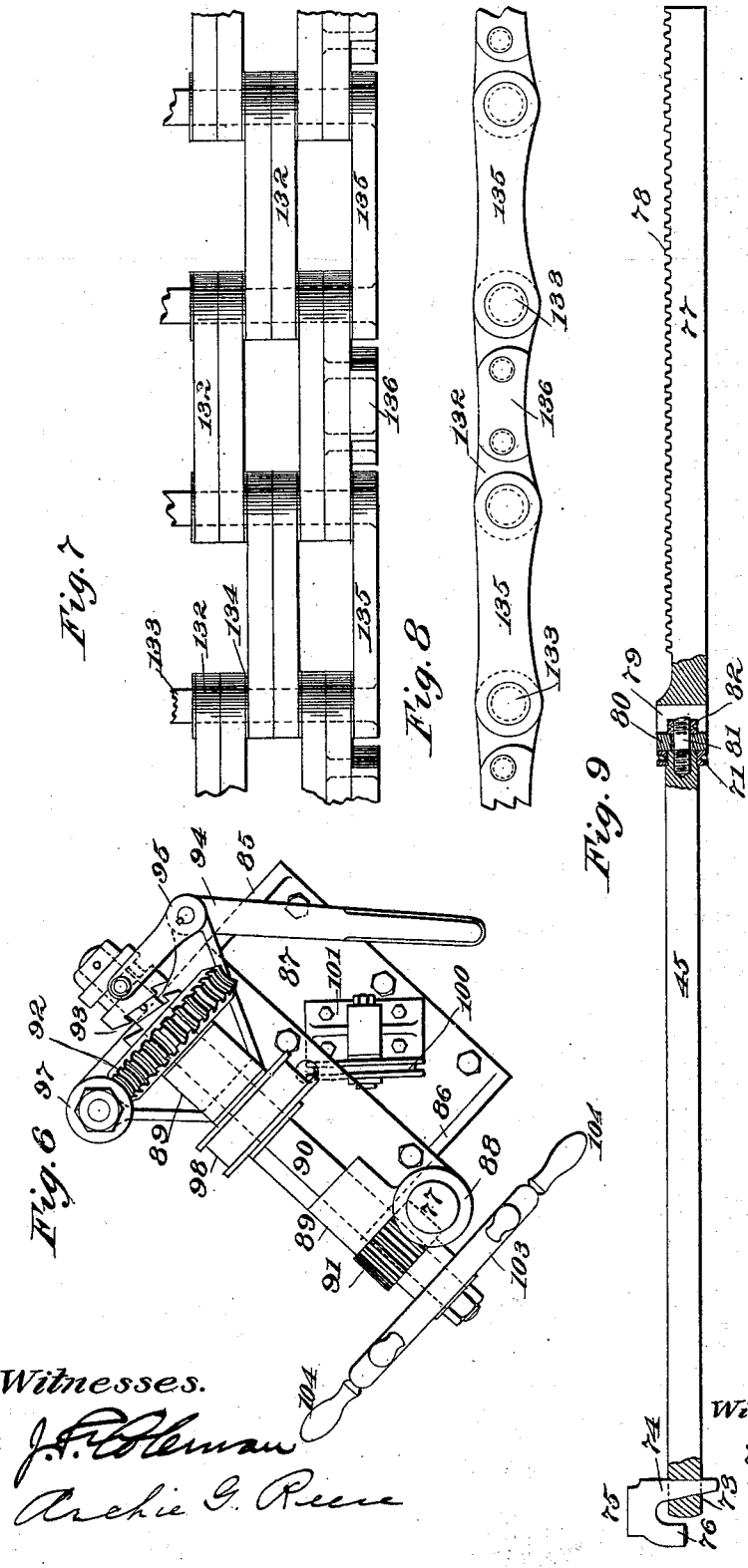
Witnesses.
Inventor
William E. Anderson No. 648,372. Patented May 1, 1900.
W. E. ANDERSON.
BALING PRESS.
(Application filed July 12, 1895.)
(No Model.) 8 Sheets—Sheet 7.

Witnesses.

Inventor
William E. Anderson

No. 648,372. Patented May 1, 1900.
W. E. ANDERSON.
BALING PRESS.
(Application filed July 12, 1895.)
(No Model.) 8 Sheets—Sheet 8.

Witnesses: Inventor
William E. Anderson
by Frank L. Dyer
Att'y.

UNITED STATES PATENT OFFICE.

WILLIAM EMMET ANDERSON, OF WASHINGTON, DISTRICT OF COLUMBIA, ASSIGNOR, BY MESNE ASSIGNMENTS, TO THE AMERICAN COTTON COMPANY, OF NEW YORK, N. Y.

BALING-PRESS.

SPECIFICATION forming part of Letters Patent No. 648,372, dated May 1, 1900.

Application filed July 12, 1895. Serial No. 555,733. (No model.)

*To all whom it may concern:*

Be it known that I, WILLIAM EMMET ANDERSON, a citizen of the United States, residing at Washington, in the District of Columbia, have invented certain new and useful Improvements in Presses for Baling Cotton into Cylindrical Bales; and I do hereby declare the following to be a full, clear, and exact description of the invention, which will enable others skilled in the art to which it appertains to make and use the same.

My invention relates to various new and useful improvements in presses for baling cotton into cylindrical bales; and the object of my invention is to provide and produce a press for this purpose which will be simple in construction and effective in use and wherein bales of the most desirable form may be produced.

The type of cotton-press to which my invention relates is that which was invented by John W. Graves and on which several Letters Patent of the United States have been granted, said patents being numbered 510,385, 510,386, 510,387, and 510,388, all bearing date the 5th day of December, 1893. In the Graves press an endless belt was employed which was mounted on rollers and in which a loop or bight was formed which passed around a core, means being provided for applying tension to said belt, whereby the enlargement of said loop or bight would be retarded. In the operation of the Graves press the cotton was first formed into a continuous sheet or bat by an ordinary condenser, which sheet or bat was fed to the press within said loop or bight. Power was then applied to the belt, so as to drive it continuously, thereby causing the sheet or bat to be wound spirally on the core, the bale being partially encircled at all times by said loop or bight. By means of the tension device which was applied to the belt, whereby the tendency of the loop or bight to enlarge was retarded, pressure was applied to the bale during its formation, so that when sufficient cotton had accumulated around the core a very dense cylindrical package was produced, after which and preferably while the bale was still in the press it was covered in any suitable way and then removed. While the employment of an endless compression-belt as described for the first time by said Graves was very desirable in cotton-presses, as by its use a large proportion of the surface of the bale was subjected to pressure, particularly near the close of the baling operation, yet the use of such a belt in the way described by Graves was open to objection in practical use for the reason that as the bale enlarged the surface compressed by the belt correspondingly increased, and it became necessary, therefore, to also increase the tension of the belt, so that the pressure per square inch on the bale would remain practically constant. Therefore when a belt made of material such as leather was used it was liable to become broken under the extreme pressure applied thereto, or when made of metal links the belt became very quickly worn out under such pressure.

In my improved press I still retain the endless compression-belt first described by Graves and use it to partially encircle the bale throughout its entire formation; but instead of applying pressure to the bale by a tension device operating directly upon the belt I employ baling-rolls for effecting the compression of the cotton, the belt being used principally to prevent the bale from expanding out of shape under the compressing effects of the rolls, whereby bales of comparatively-large diameters may be produced. In this way I retain all the advantage incident to the employment of an endless compression-belt, and by removing all excessive strains thereon I prevent the belt from becoming worn out or broken in ordinary use.

Broadly considered, therefore, my improved cotton-press consists in the combination of an endless belt in which a loop or bight is formed which partially encircles the bale throughout its entire formation and two or more baling-rolls operating in conjunction with said belt for effecting the compression of the sheet or bat of cotton as it is wound in place on the bale.

My present invention also has reference to improved mechanism for withdrawing the core after a sufficient amount of cotton has accumulated thereon and for replacing said core to its proper position when a new bale is to be formed; also, to improved mechanism whereby a very thick bat or sheet may be obtained from an ordinary condenser without the necessity of reducing the peripheral speed of the condensing-cylinder thereof; also, to an improved device whereby when the bale is being covered in the press the cotton coming from the condenser may be deflected out of its normal course and be accumulated on a separate roll, so that the gin and condenser may work continuously; also, to improved mechanism for applying pressure to the compression-rolls, and to further details of construction, all as will be more fully hereinafter described and claimed.

For a better comprehension of my invention attention is directed to the accompanying drawings, forming a part of this specification, and in which—

Figure 2:
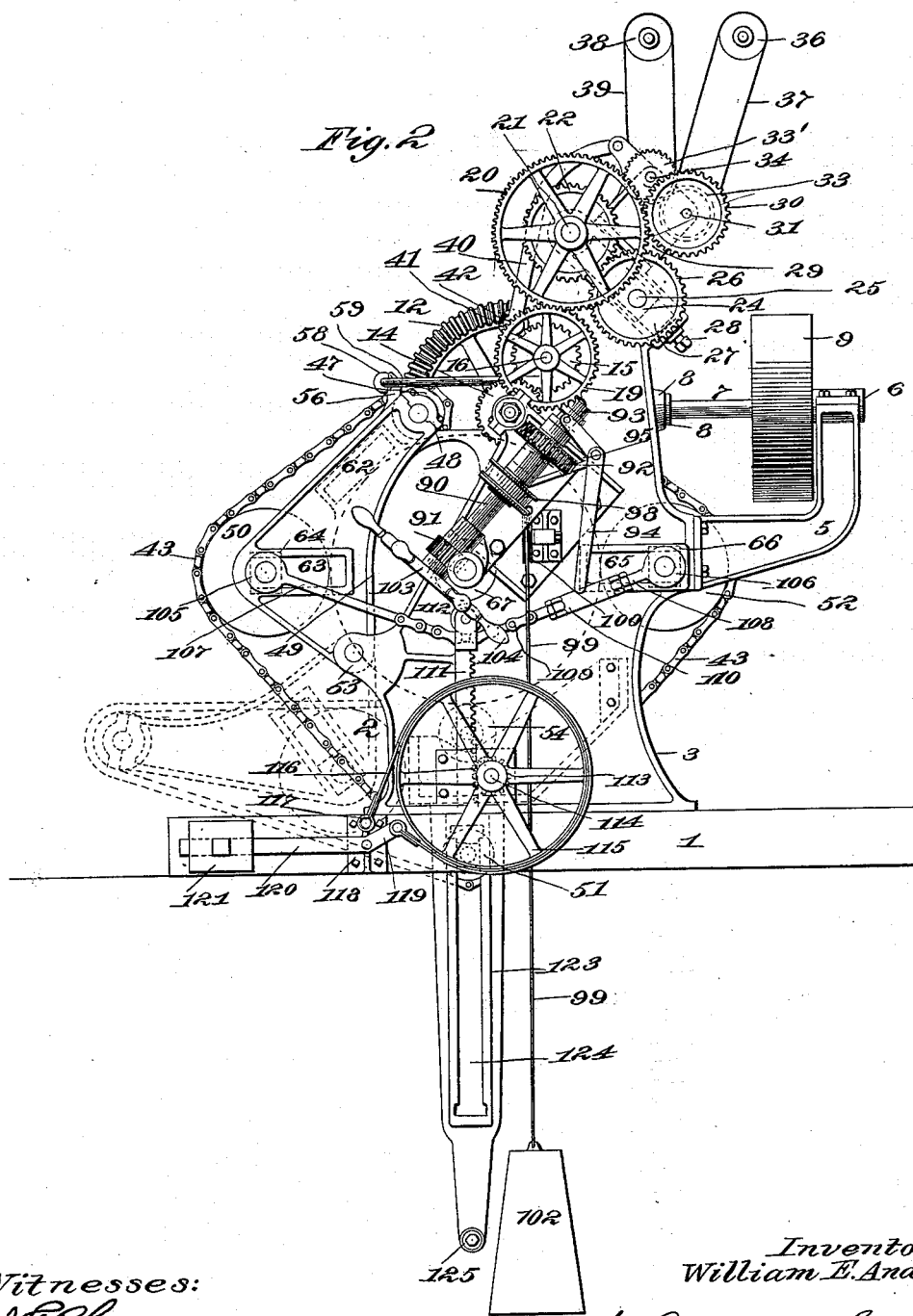
Figure 10:
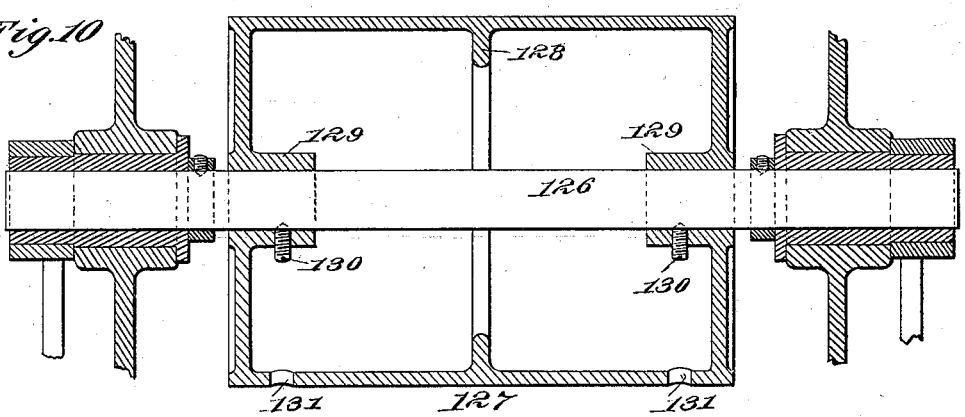
Figure 11:
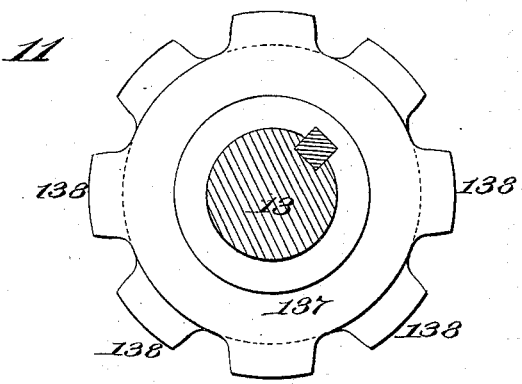
Figure 12:
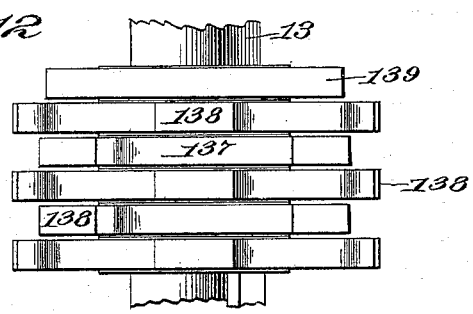

Figure 1 is a plan view of my improved cotton-press; Fig. 2, a side elevation of the same; Fig. 3, a rear elevation of the same; Fig. 4, a vertical section taken on the line $xx$ of Fig. 2; Fig. 5, an enlarged elevation of the core and core-operating mechanism, illustrating also the sprocket-wheels for driving the belt and showing the flanges and a portion of the frame of the machine in section; Fig. 6, a front elevation of the core-operating mechanism; Fig. 7, a plan view of a portion of the compression-belt; Fig. 8, a side elevation of the same; Fig. 9, a side view of the core and core-rack; Fig. 10, a sectional view of one of the baling-rolls; Fig. 11, an enlarged side view of the sprocket-wheels for driving the compression-belt; Fig. 12, a plan view of a portion of the same; and Fig. 13, a vertical sectional view showing my improved press in connection with a condenser of a well-known type, the condenser being used for the purpose of separating the cotton coming from the gins from the blast by which it is carried.

In all of the above views corresponding figures of reference indicate like parts.

The machine is mounted, preferably, on heavy wooden skids 1 1, which may in turn be supported in any suitable way in the gin-house or elsewhere.

2 2 are the main side frames of the machine, made, preferably, of metal of the form shown and having webs 3 for stiffening the same. These frames 2 are provided with suitable bearing-boxes and slotted bearings, to be hereinafter described.

4 is a flanged connecting-brace bolted to the bottoms of the frames 2 and constituting the bottom frame of the machine.

5 is a supporting-arm bolted to the rear edge of one of the side frames 2 and having a bearing-box 6 at its upper end. 7 is the main driving-shaft mounted in said bearing-box 6 and in the bearing 8, formed on one of the frames 2.

9 is the main driving-pulley, and 10 is a clutch of any suitable construction for clutching the same into engagement with the shaft 7. Said clutch is shown only in Fig. 4, so as not to complicate the other views.

11 is a beveled pinion carried by the shaft 7, Figs. 1 and 3, meshing with the bevel gear-wheel 12, keyed on the main shaft 13 of the machine. 14 is a spur-wheel keyed to said shaft 13 at the other side of the machine. 15 is another spur-wheel, with which said spur-wheel 14 engages. The spur-wheel 15 is carried on a shaft 16, mounted in the main frame of the machine.

17 is a roller keyed to the shaft 16.

19 is a gear-wheel keyed to the shaft 16 outside of the spur-wheel 15 and meshing with a larger gear-wheel 20, keyed to a shaft 21, mounted in the main frame of the machine.

22 is a compression-roll keyed to the shaft 21.

23 is an incline slotted bearing at the top of each side frame 2 in line with the bearings for the shaft 21, Fig. 4.

24 is a sliding bearing-box working in each slotted bearing 23. 25 is a shaft mounted in said bearing-boxes 24, and 26 is a compression-roll keyed to said shaft 25.

27 is an elastic compression-buffer, made, preferably, of rubber, bearing against the bottom side of each bearing-box 24 for effecting the necessary pressure between the compression-rolls 22 and 26. The amount of pressure imposed by said buffers may be regulated by adjusting-screws 28. Said buffers may, however, be dispensed with, and an inelastic pressure may be imposed between the rolls 22 and 26 by the adjusting-screws 28.

29 is an auxiliary supporting-frame bolted to each side frame 2. 30 is a gear-wheel which meshes with the gear-wheel 20 and which is keyed to a shaft 31, mounted in said auxiliary frame, said shaft 31 having keyed to it a roller 32, Fig. 4, made either of metal or of wood, preferably the former.

33 is a gear-wheel which is keyed on the shaft 31 to one side of the gear-wheel 30. The gear-wheel 33 is of the same size as and engages with a gear-wheel 33', which is carried on a shaft 34. A roller 35 is keyed to the shaft 34 and engages or nearly engages with the roller 32.

36 is a roller supported above and to one side of the roller 32 in any suitable way, and 37 is a belt made, preferably, of canvas or of leather, which connects the rollers 36 and 32. 38 is a roller mounted preferably vertically above the roller 35, and 39 is a corresponding belt connecting the said rollers 35 and 38. It will be observed that the inner surfaces of the said belts 37 and 39 form an inclined trough or chute by means of which the sheet or bat coming from the condenser will be increased in thickness, as will be presently explained.

Figure 13:
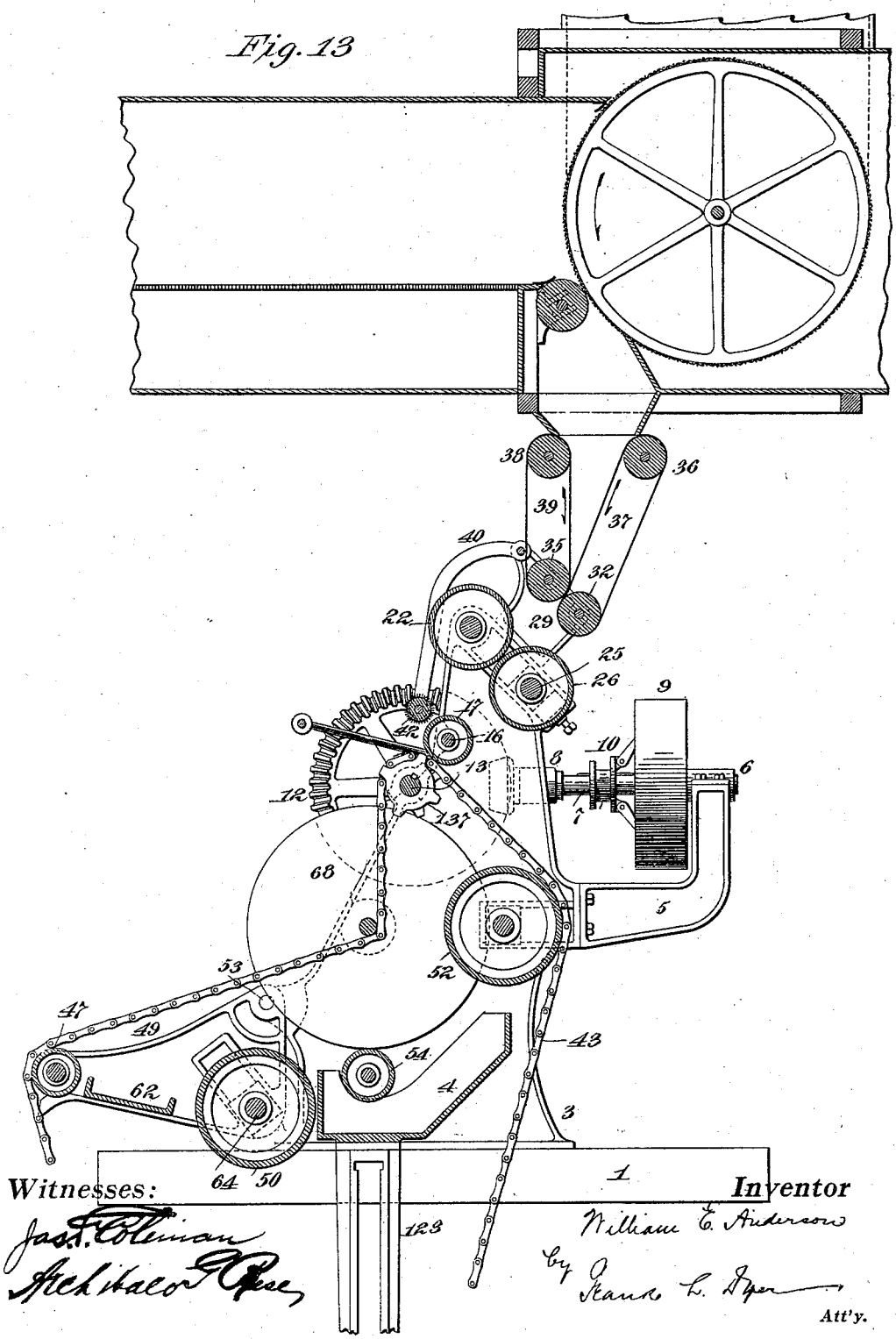

In Fig. 13 I show an ordinary single drum-condenser for feeding the cotton to the belts 37 and 39; but it will be understood that any other suitable device may be employed for separating the cotton coming from the gins from the blast which carries it and for depositing the cotton into the space inclosed by said belts, whereby it will be fed to the press in the form of a very thick and uniform sheet or bat.

40 is a swinging arm mounted at its upper end at each side of the machine in the auxiliary supporting-frame 29, each arm being provided with an open bearing 41 at its lower end.

42 is a small accumulating-roll carried in the open bearings 41 and which is made, preferably, of wood or metal, being armed with small projecting teeth or pins for picking up the bat or sheet when necessary. This accumulating-roll 42 may be brought down into contact with the roller 17; but it is normally elevated up and away from said roller, so as not to interfere with the cotton passing over the same.

43 is an endless compression-belt made, preferably, of steel links, as I will presently explain, and which passes over and around a series of sprocket-wheels keyed to the main shaft 13, thence around the core 45 to form an encircling loop or bight 46, thence over the roller 47, mounted in bearing-boxes 48 in the upper ends of the swinging arms 49, to be presently described, thence around one of the baling-rolls 50, thence down and around an idler 51, and thence over the other baling-roll 52.

The swinging arms 49 are each of the general shape shown, being hinged to the front of each side frame 2 by a heavy joint 53, whereby said arms, when desired, may be swung downward, so as to open the loop or bight 46 for the removal of the completed bale.

54 is a roller mounted in rigid bearings in the side frames 2 at such a position as to be borne upon by the bight or loop 46 when the bale has reached its maximum diameter and which serves to then commence to compress the bale as cotton accumulates thereon. Said swinging arms are to be counterbalanced in any suitable way, so that they will immediately and automatically return to their proper positions after the bale has rolled out of the machine.

56 is a lug or ear cast on the upper face of each swinging arm 49, and 57, Fig. 4, is a horizontal bar or rod which engages in front of said ears when the swinging arms 49 are to be locked in place. Said rod or bar 57 is mounted in bearings 58, carried in swinging arms 59, which are hinged to the side frames 2 of the machine. A small handle (not shown) may be attached to one end of the bar or rod 57, whereby the said rod or bar may be rolled on the lugs or ears 56, so as to unlock the upper end of the swinging arms 49 when it is desired to remove the bale from the machine. The rear face of each lug or ear 56 is inclined at 61, as shown, Fig. 4, whereby when the swinging arms 49 are automatically returned to their proper position the said bar 57 will ride up on said inclines 61 and drop in front of the lugs or ears 56 for locking the arms in place.

62 represents a web-frame connecting the two swinging arms 49, whereby said swinging arms 49 will be always kept parallel and will be materially strengthened.

63 is a slotted bearing formed in each swinging arm 49 in line with the core 45, and 64 is a sliding bearing-box in each slotted bearing 63 and carrying the shaft of the baling-roll 50.

65 is a slotted bearing formed in each side frame 2 in line with the slotted bearing 63, and 66 is a bearing-box working in each of said slotted bearings 65, said bearing-boxes 66 carrying the shaft of the other baling-roll 52.

67 is a heavy bearing formed on each side frame 2, (see particularly Fig. 5,) each of which bearings 67 supports one of the end flanges 68 for the bale. Each end flange 68 (see Fig. 5) is of the general form shown, being provided with an integral sleeve 69, which works within the bearing 67. Each end flange is made, preferably, of cast metal, perfectly plain on the inner side, which comes in contact with the bale, and gradually tapered on its outside toward its periphery, there being a flat portion 70, provided on the outside of each end flange, which works against the inside of the corresponding bearings 67. Ordinarily when the bale is being formed the end flanges are held a short distance inward from said bearings 67, so that when the core is released the said end flanges may be separated slightly under the expansion of the cotton, whereby the bale may be more easily removed from the machine.

The core 45, as shown particularly in Figs. 5 and 9, consists of a single polished-steel shaft about two inches in diameter and provided at one end with a collar 71, which fits within a recess 72, Fig. 5, in the cylindrical sleeve 69 of one of the flanges 68. The other end of the core 45 is provided with an inclined keyway 73 therein, in which a tapered key 74 is inserted. This key 74 fits against the cylindrical sleeve 69 of the other end flange. The key 74, as shown, is provided with a flat portion 75, by which it may be driven in place, and with an integral curved finger 76, extending past the end of the core and by means of which the key may be driven out when desired. The end of the finger 76 being in line with the center of the core travels very slowly, and may be easily hit with a hammer for driving out the key. Instead of employing a key 74, as explained, for this purpose the end of the core may be secured in place in any suitable way, such as by a nut engaging with threads on the outside of the end of the core or by a screw-bolt engaging with a screw-threaded chamber formed in the end of the core.

77 is a core-rack for withdrawing the core from the bale or for reinserting the same in the machine when desired. This core-rack 77 is made, preferably, from a cylindrical steel shaft turned down on one side and having teeth 78 cut therein. The head of the core-rack is provided with a vertical passage 79 therein and with a horizontal passage 80, Fig. 9, leading into the same.

81 is a short cylindrical steel rod rigidly secured in the end of the core adjacent to the collar 71 and inserted in the passage 80, being provided with a nut or collar 82 at its outer end, which nut may be secured in position through the passage 79. By means of this construction it will be observed that I provide a swivel connection between the core and core-rack, so that the core may revolve independent of the latter.

Referring to Figs. 5 and 6, 83 is a web-casting at one side of the machine. This casting consists of a plate 84, having stiffening-webs 85 and 86 at its top and bottom and with a base-plate 87, which is bolted to a suitable bed-cast with one of the side frames 2 of the machine directly above and to one side of the bearing 67. The web-plate 84 is arranged at an angle with respect to the plane of the machine, as shown.

88 is a bearing formed on the lower part of the frame 83 in line with the bearing 67, and in which bearing 83 is mounted the end of the core-rack 77. The bearing 88 is open at its end, whereby said core-rack may be moved out through the same when the core is to be withdrawn.

89 89 are bearings in line with each other formed on the end of the supporting-frame 83 and in which a shaft 90 is mounted, said shaft carrying a spur-wheel 91 at its lower end, which meshes with the teeth 78 of the core-rack 77.

92 is a worm-wheel turning loosely upon the shaft 90 near its upper end above the top bearing 89. 93 is a clutch for throwing said worm-wheel into connection with said shaft 90 when the core is to be withdrawn. This clutch 93 is operated by a lever 94, mounted on a bracket 95, secured to or cast integral with the supporting-frame 83.

96 is a bearing formed at the upper part of the supporting-frame 83 at one side thereof in line with the main shaft 13, and said main shaft extends through said bearing 96 and is supported therein.

97 is a worm keyed to the extreme end of the main shaft 13 and engaging with the worm-wheel 92.

98 is a drum keyed to the shaft 90 between the bearings 89 89, and 99 is a cable or rope wound around said drum and passing over a pulley 100, mounted in a casting 101, secured to the side frame 2 or to the supporting-plate 87. This cable 99 is provided at its lower end with a weight 102, which hangs below the machine.

103 is a wheel keyed to the lower end of the shaft 90 and provided with radial handles 104, by which it may be easily turned when desired.

105 is a collar surrounding each end of the shaft of the baling-roll 50 or a cylindrical projection on each bearing-box 64, as may be desired. 106 is a corresponding collar at each end of the shaft of the baling-roll 52.

107 is an integral rod for each collar 105, and 108 is a corresponding rod for each of the collars 106. The ends of the rods 107 and 108 are connected by a short heavy chain or links 109.

110 is an ordinary turnbuckle for taking up any slack in the parts or for adjusting the parts.

111 is a rack at each side of the machine, provided with a roller 112 at its upper end, which roller bears upon the chain or links 109. The teeth of each rack 111 engage with a pinion 113 at each side of the machine, said pinions being keyed to a shaft 114, which is mounted in suitable bearings formed in the side frames 2. The said shaft carries a face-wheel 115, which is located at one side of the machine.

116 is a steel band or strap faced with leather or some other appropriate material, which is anchored to a heavy pin 117 in a plate 118, bolted to one of the skids 1, upon which the machine is supported. The other end of this steel strap is connected to the free end of a short lever-arm 119, which is arranged in an inclined plane, as shown with respect to the bed-plate of the machine, and which is provided with a longer horizontal lever-arm 120. These arms 119 and 120 are mounted in the plate 118.

121 is a weight which is applied to the lever-arm 120, being movable thereon, and by which the friction between the leather surface of the steel band 116 and the face-wheel 115 can be suitably regulated. The racks 111 are kept in engagement with the pinions 113 by rollers placed behind said racks or in any suitable way.

The idler or guide-roller 51 is preferably guided in its movements up and down by light guides 122 123, bolted to the bottom of the machine, and which are provided with vertical slots 124 therein, in which the bearing-boxes of the guide-roller 51 move. These guides 122 123 are connected together at the lower ends by a rod 125.

The various rolls employed in the machine are preferably of the construction shown in Fig. 10, to which attention is directed.

126 indicates the shaft of a roll which works in the proper bearing-boxes, and 127 is the roll. This roll is preferably cast hollow, as shown. In large rolls one or more strengthening-ribs 128 may be formed on the inside of the periphery.

129 indicates collars cast with the roll and which are fitted to the shaft 126. These collars are rigidly keyed to said shaft by means of set-screws 130, which may be introduced through openings 131 in the periphery of the roll, said openings being closed, if necessary, after the roll has been mounted.

The compression-belt which I employ is made, preferably, of steel links, as shown in Figs. 7 and 8. The main portion of the belt is composed of links 132, arranged in pairs and mounted on steel bearing-rods 133. Ordinary washers 134 are strung on the rods 133 between each pair of links. In this way equidistant openings will be formed in the belt, within which will engage the teeth of the various sprocket-wheels for driving the belt, as I will presently explain. In order that the edges may be approximately straight, I employ single links 135 on the outside, the holes for the bearing-rods being flared slightly, whereby the said rods may be headed within said holes. I also provide an extension-piece 136, riveted to the outside of each of the links 132, which extension-pieces fit between the links 135 135. The faces of the links which press against the bale are preferably curved slightly, as shown, although this is not an essential.

The compression-belt 43 is of approximately the same width as the desired bale and works within and between the end flanges, being in contact with the core when the operation commences.

The construction of sprocket-wheels for driving the compression-belt will be understood from an inspection of Figs. 11 and 12, to which attention is directed. The main shaft 13 between the side frames 2 2 is provided with a series of disks 137, keyed thereon, each disk being provided with sprocket-teeth 138, preferably four, formed therewith, the sprocket-teeth of one disk alternating with the sprocket-teeth of the other disk, whereby a practically-continuous cylinder will be produced having teeth which engage with the openings formed between the links of the compression-belt. A disk 139 without teeth is secured to the shaft 13 at each side of the series of disks 137 and supports the links 135 and the extension-pieces 136 of the outside links 132 at the sides of the belt. In this way a very cheap and effective sprocket-driving mechanism will be produced, the disks 137 being easily removable when worn.

In the formation of cotton into cylindrical bales I have found from extensive experiments that it is necessary, or at least highly desirable, that the cotton should at all times be subjected to pressure as it is wound in place on the bale. I find, however, that during the preliminary stages of baling cotton care should be taken to prevent excessive pressure being applied thereto, for the reason that the cotton tends to become caked on the core and its quality and fiber are thereby seriously damaged.

In my improved press, as will be seen from an inspection of the drawings and as I will presently explain, the cotton is subjected to two separate and distinct pressing operations, the first pressure—namely, that produced entirely by the belt—being sufficient to compress the cotton around the core and on the bale and expel therefrom most, if not all, of the air contained therein, and the second pressure produced by the baling-rolls being sufficient to act upon the outer layers of the bale and press them tightly in place, whereby the desired degree of density will be obtained. In this way I produce a bale which will be of great density throughout and wherein none of the cotton will have been subjected to such an excessive pressure as will in any way affect the quality of its fibers.

The operation of my improved press is as follows: The gins are operated in the usual way and blow the cotton in the form of flakes onto the gauze cylinder or cylinders of a suitable condenser, Fig. 13 showing a good type thereof and wherein the cotton is formed into a continuous sheet or bat. The pulley 9 being thrown into connection with the driving-shaft 7, the pinion 11, meshing with the gear-wheel 12, will operate the main shaft 13 of the machine. The various sprockets 137 137, which are keyed to this shaft, engaging with the belt 43 will operate the same continuously. The said belt will be at its lowest limit of movement, the loop or bight 46 thereof being in direct engagement with the core 45. The gear-wheels 14, 15, 19, 20, 30, 33, and 33' will be rotated, thereby operating the several rollers 17, 22, 26, 32, 35, 36, and 38, and the belts 37 and 39 in the direction of the arrows. Since the belts 37 and 39 are arranged to travel at a much slower speed than the sheet or bat coming from the condenser, the said sheet or bat as it enters the machine between said belts will tend to be lapped back and forth in the space between said belts and be passed out between the rollers 32 and 35 in a much thicker form than originally. By adjusting the relative speed of the condensing-cylinder and said belts the desired thickness of the bat can be easily obtained, it being obvious that by employing a very thick bat the speed of the machine can be materially reduced and there will be much less wear of the parts in consequence. It is to be understood, however, that the thickness of the bat should not be made so great that the proper density of the bale cannot be obtained. The thickened bat or sheet after leaving the lower ends of the belts, by which it will be slightly compressed, is passed between the heavy compression-rolls 22 and 26, by which it will be subjected to a very great pressure, such pressure being sufficient to expel all the air from the bat and to give it strength and impart to it a blanket-like appearance, but not being sufficient to injure the fiber. The compressed sheet from these rolls passes over the roller 17 and thence between the roller 47 and the sprocket 137 into the loop or bight 46 of the compression-belt. The cotton on reaching the bottom of this loop or bight comes in contact with the core 45 and is wound around the core convolutionally by the action of the belt, the core revolving with the bale. As the cotton accumulates around the core it tends to distend the loop or bight and slowly elevates the guide-roller 51. The baling-rolls 50 and 52 at this time will be in their inner positions, said baling-rolls working between the end flanges 68, but out of contact with the loop or bight. During this preliminary compression the cotton will be subjected to the action of the belt alone, whereby the danger of caking the cotton on the core or of injuring its fiber is overcome. As the bale continues to enlarge and the loop or bight 46 expands more and more, it finally will come in contact with the baling-rolls 50 and 52, which will compress the bale through the belt. The continued enlargement of the bale causes these rolls to be moved outward in the slotted bearings 63 and 65, which movement through the connecting-arms 107 108 and chain 109 on each side tends to elevate the racks 111, which racks, being in engagement with the pinions 113, revolve the latter. The pinions 113 in revolving carry the face-wheel 115 with them against the friction imposed by the leather inner face of the steel band 116, the amount of friction being regulated by the weight 121 on the lever-arm 120. The baling-rolls 50 and 52 will in this way tightly compress each layer of the sheet or bat as it is wound in place on the bale, which pressure will be automatically increased as the bale increases in size by reason of the increase in the angle between the arms 107 108 and the racks 111. When the bale has reached its maximum diameter, or, in other words, when it is so expanded that the loop or bight 46 of the belt comes in contact with all the rollers that encircle it, the core is to be withdrawn. The pin 74 is first removed from the core, which will allow the end flanges 68 to separate slightly, so as to allow the bale to pass easily from between the same, and the handle 94 is operated, so that the clutch 93 will throw the worm-wheel 92 into engagement with the shaft 90. This worm-wheel will then be turned by the worm 97, operated by the main shaft 13, and the shaft 90 will be operated, whereby the pinion 91, engaging with the teeth 78 of the core-rack 77, will withdraw the core from the bale. By providing a short space at the end of the teeth 78 the movement of the core-rack will be arrested, when the core is entirely withdrawn. When the core has been withdrawn, the lever 94 is returned to its original position and the worm-wheel 92 is disconnected from the shaft 90. The bale is now suitably bound or tied in any way, but preferably in the manner I have invented and which is described in my application for Letters Patent filed June 21, 1895, Serial No. 553,540. The bar 57 is now rolled up on the lugs or ears 56 by means of its operating-handle, so as to release the swinging arms 49. These swinging arms, under the weight of the bale, are moved downward and allow the bale to roll out of the front of the machine, where it is received by the attendant. While the bale is being bound and tied, the accumulator-roller 42 is brought down into engagement with the roller 17, and the cotton which passes over said latter roller will be picked up by the teeth of the accumulator-roller and be wound up thereon. When a new bale has been started, the accumulator-roller 42, with its accumulated cotton, is removed from the open bearings 41, and its position is reversed, so that the cotton may unwind therefrom and enter the machine with the bat which comes directly from the condenser, or the cotton on the accumulator-roller may be unwound therefrom in any other suitable way. After the bale has left the machine the swinging arms 49 will be automatically returned to their position by the counterbalancing-weight or other means and will be locked. Before this is done, however, the core should be replaced in the machine, and this is effected in connection with the expulsion of the bale in the following way: Just as the bale commences to leave the machine the handles 104 are grasped by the operator, by which the shaft 90 and spur-wheel 91 will be turned, and the end of the core will be held in engagement with the bale with considerable pressure. The operator maintains this pressure as the bale rolls out of the machine, the end of the core remaining in engagement with the bale, so that the end of the core will pass between the bale and the belt, after which, by operating the hand-wheel 104, the core may be easily returned to its position and again held by means of the key 74. These operations are materially facilitated by employing a counterbalance-weight 102, which counterbalances the core and enables the operator to easily move the same.

Many of the improvements which I have above described are specific in character and by means of which a very efficient and desirable cotton-press is produced; but other improvements are of a generic character, and I desire to have them construed herein in as broad a light as possible. For example, I believe I am the first person to suggest a way by which the bat or sheet coming from the condenser can be effectively thickened, whereby the speed of the machine could be correspondingly reduced, so as to save wear. This improvement is of particular advantage, because heretofore the only way in which a thick bat could be produced was either by employing two or more separate condensing-cylinders, which made a very expensive construction, or else by operating a condensing-cylinder at a very low rate of speed, which was objectionable, as the condenser was liable to become clogged and rendered inoperative. The improvement which I have made for this purpose is of such a construction and character that a sheet or bat of any desired thickness can be produced without altering the peripheral speed of the condensing-cylinder. It is obvious that instead of employing two belts, such as I have described, two or more rollers might be used, operating at a slower speed than the condensing-cylinder and receiving the bat between them.

Another important feature of my present press is the idea which I have described therein of employing a belt for effecting the preliminary compression of the bale and two or more baling-rolls for compressing the bale during its final stages. This idea is of particular importance, as I am thereby enabled to produce a bale which will be of great density and wherein the fibers will not be affected or damaged to any extent. By employing an endless belt in connection with baling-rolls I also prevent the bale from expanding on each side of the rolls, and I therefore produce cotton-bales with comparatively great diameters.

Another improvement on which I lay particular stress is the general means I have shown for withdrawing the core from the bale and for returning the core after the bale has been removed from the machine.

A still further improvement which is of great value is the use of the accumulator described for picking up a sheet or bat and accumulating the same during the covering and tying of the bale, as in this way I am enabled to operate the press while the gins are continuously working.

Having now described my invention, what I claim as new, and desire to secure by Letters Patent, is as follows:

1. In a cotton-press for making cylindrical bales, the combination with baling-rolls for effecting pressure on the bale, of a belt in contact with the bale for arresting expansion thereof between said rolls, and means independent of the belt for applying pressure to said baling-rolls, substantially as set forth.

2. In a cotton-press for making cylindrical bales, the combination with two baling-rolls mounted in substantially the same horizontal plane for effecting pressure on the bale, of a belt in contact with the under side of the bale for arresting expansion thereof between the rolls, and means independent of the belt for applying pressure to said baling-rolls, substantially as set forth.

3. In a cotton-press for making cylindrical bales, the combination of baling-rolls for effecting pressure on the bale, said rolls being gradually separated as the bale enlarges, a belt in contact with the bale for arresting expansion thereof between said rolls, and means independent of said belt for imposing a resistance to the separation of said rolls, substantially as set forth.

4. In a cotton-press for making cylindrical bales, the combination with baling-rolls for effecting pressure on the bale, of a belt in contact with the bale for arresting expansion thereof, means independent of the belt for applying pressure to said baling-rolls, and means for rotating said rolls and for driving said belt at the same surface speed, substantially as set forth.

5. In a cotton-press for making cylindrical bales, the combination of a core on which the bale is formed, two baling-rolls mounted in substantially the same horizontal plane, one on each side of said core, said baling-rolls being gradually separated as the bale enlarges, a belt normally in contact with the core and adapted to be moved away from the same as the bale enlarges, and to arrest expansion of the bale, and means independent of said belt for imposing a resistance to the separation of said baling-rolls, substantially as set forth.

6. In a cotton-press for making cylindrical bales, the combination with an endless belt which partially encircles the bale during the baling operation and which applies pressure to the bale during the preliminary stages of the baling operation, of two or more baling-rolls operating in conjunction with said belt and arranged so as to apply pressure to the bale only during the final stages of the baling operation, and means independent of the belt for applying pressure to said rolls, substantially as set forth.

7. In a cotton-press for making cylindrical bales, the combination with an endless belt which partially encircles the bale during the baling operation and which applies pressure to the bale, of two or more baling-rolls normally out of contact with the bale but arranged so as to be engaged by the bale when it is partially formed, and to apply pressure thereto; and means independent of the belt for applying pressure to said rolls, substantially as set forth.

8. In a cotton-press for making cylindrical bales, the combination with an endless belt which partially encircles the bale during the baling operation and means for driving said belt; of two or more baling-rolls acting upon the bale in conjunction with said belt for applying pressure to the bale, said baling-rolls being driven by the contact of the belt thereon; and means independent of the belt for applying pressure to said rolls, substantially as set forth.

9. In a cotton-press for making cylindrical bales, the combination with an endless belt a portion of which is formed into a loop or bight which partially encircles the bale during the baling operation; two or more baling-rolls acting upon the bale in conjunction with said belt for applying pressure to the bale; means independent of the belt for applying pressure to said rolls; and means whereby said loop or bight may be opened for the removal of the finished bale, substantially as set forth.

10. In a cotton-press for making cylindrical bales, the combination of a core on which the bale is formed, a traveling pressure surface or surfaces for compressing the bale during its formation, a main shaft for driving said pressure surface or surfaces, whereby the bale will be continuously rotated; mechanism operated from said main shaft for withdrawing the core from the bale; and means for returning said core to its operative position for the formation of a new bale, substantially as set forth.

11. In a cotton-press for making cylindrical bales, the combination of a core on which the bale is formed, a traveling pressure surface or surfaces for compressing the bale during its formation, a main shaft for driving said pressure surface or surfaces, whereby the bale will be continuously rotated, mechanism operated from said main shaft for withdrawing the core from the bale, and mechanism operated by hand for returning said core to its operative position for the formation of a new bale, substantially as set forth.

12. In a cotton-press for making cylindrical bales, the combination of a core on which the bale is formed, a traveling pressure surface or surfaces for compressing the bale during its formation, a main shaft for driving said pressure surface or surfaces, whereby the bale will be continuously rotated, mechanism operated from said main shaft for withdrawing the core from the bale, a counterbalancing-weight connected with the core and exerting stress thereon as described, and means for returning said core to its operative position for the formation of a new bale, substantially as set forth.

13. In a cotton-press for making cylindrical bales, the combination of a core on which the bale is formed, two end flanges normally secured to said core against expansion of the bale, but movable toward and away from each other for the purpose mentioned, means for applying pressure to the bale, and means for withdrawing the core from the bale, substantially as set forth.

14. In a cotton-press for making cylindrical bales, the combination of a core on which the bale is formed, two end flanges normally secured to said core against expansion of the bale, but movable toward and away from each other for the purpose mentioned, means for applying pressure to the bale, and means operated from the press for withdrawing the core from the bale, substantially as set forth.

15. In a cotton-press for making cylindrical bales, the combination of a core on which the bale is formed, two end flanges normally secured to said core against expansion of the bale, but movable toward and away from each other for the purpose mentioned; means for applying pressure to the bale; mechanism operated from the press for withdrawing the core from the bale, and mechanism operated by hand for returning the core, substantially as set forth.

16. In a cotton-press for making cylindrical bales, the combination of two side frames, an end flange carried in a bearing in each frame and revolving therein, a core on which the bale is formed mounted between said end flanges, a shoulder or stop on said core against which one of said flanges is held, and a removable key in said core against which the other flange is held, substantially as set forth.

17. In a cotton-press for making cylindrical bales, the combination of a core on which the bale is formed, two end flanges, a shoulder or stop on said core against which one of said flanges is held, a removable key in said core against which the other flange is held, and means for withdrawing the core from the bale, substantially as set forth.

18. In a cotton-press for making cylindrical bales, the combination of a core on which the bale is formed, two end flanges, a shoulder or stop on said core against which one of said flanges is held, a removable key in said core against which the other flange is held, and means operated from the press for withdrawing the core from the bale, substantially as set forth.

19. In a cotton-press for making cylindrical bales, the combination of a core on which the bale is formed, two end flanges, a shoulder or stop on said core against which one of said flanges is held, a removable key in said core against which the other flange is held, means for withdrawing the core from the bale, and means for returning said core, substantially as set forth.

20. The combination with a cotton-press for making cylindrical bales, of a device for feeding a thick bat to said press, comprising a hopper or receptacle into which cotton is delivered, said hopper being composed of a movably-supported belt and means acting in conjunction therewith for permitting the feed of the cotton out of the hopper, there being a discharge-opening at the lower end of the hopper through which the cotton is discharged, means for slowly driving the movably-supported belt, whereby the cotton accumulated in the hopper will be forced toward and out of the discharge-opening and compressed gradually so as to leave the discharge-opening as a thick bat, and means for separating the cotton blown from the gins from the blast by which it is carried and for depositing the cotton into said hopper, substantially as set forth.

21. The combination with a cotton-press for making cylindrical bales, of a device for feeding a thick bat to said press, comprising a hopper or receptacle into which cotton is delivered, said hopper consisting of two converging, movably-supported belts, there being a discharge-opening between the adjacent lower ends of said belts, means for slowly driving the belts, whereby the cotton accumulated between them will be forced toward and out of the discharge-opening and compressed gradually so as to leave the discharge-opening as a thick bat, and means for separating the cotton blown from the gins from the blast by which it is carried and for depositing the cotton into said hopper, substantially as set forth.

22. The combination of a cotton-press for making cylindrical bales, said press receiving a continuous sheet or bat from a condenser;

and means for increasing the thickness of said sheet or bat before it is wound in the bale, substantially as set forth.

23. The combination of a cotton-press for making cylindrical bales, said press receiving a continuous sheet or bat from a condenser; and means between said press and condenser for increasing the thickness of said sheet or bat and decreasing the speed with which said sheet or bat is fed to said press, for the purpose mentioned, substantially as set forth.

24. The combination of a cotton-press for making cylindrical bales, said press receiving a continuous sheet or bat from a condenser; means for increasing the thickness of said sheet or bat; and means for compressing said thickened sheet or bat before it is wound on the bale, substantially as set forth.

25. The combination of a cotton-press for making cylindrical bales, said press receiving a continuous sheet or bat from a condenser; means for increasing the thickness of said sheet or bat, and a pair of compression-rolls for compressing said thickened sheet or bat before it is wound on the bale, substantially as set forth.

26. The combination of a cotton-press for making cylindrical bales, said press receiving a continuous sheet or bat from a condenser; and two traveling surfaces arranged opposite to each other, and traveling at a slower rate of speed than the sheet or bat coming from the condenser; said traveling surfaces receiving the sheet or bat between them, whereby the thickness of said sheet or bat will be increased, and the speed with which it is fed to the press will be decreased, substantially as set forth.

27. The combination of a cotton-press for making cylindrical bales, said press receiving a continuous sheet or bat from a condenser, and two endless belts arranged opposite to each other, and traveling at a slower rate of speed than the sheet or bat coming from the condenser, said endless belts receiving the sheet or bat between them, whereby the thickness of said sheet or bat will be increased, and the speed with which it is fed to the press will be decreased, substantially as set forth.

28. The combination of a cotton-press for making cylindrical bales, said press receiving a continuous sheet or bat from a condenser, and two endless belts arranged opposite to each other with their lower ends in contact or nearly so, and traveling at a slower rate of speed than the sheet or bat coming from the condenser; said traveling surfaces receiving the sheet or bat between them, whereby the thickness of said sheet or bat will be increased, and the speed with which it is fed to the press will be decreased, substantially as set forth.

29. The combination of a cotton-press for making cylindrical bales, said press receiving a continuous sheet or bat from a condenser; and means between said press and condenser for receiving and accumulating said sheet or bat when the bale is being covered or bound, substantially as set forth.

30. The combination of a cotton-press for making cylindrical bales, said press receiving a continuous sheet or bat from a condenser, and an accumulating-roller between said press and condenser, normally out of engagement with said sheet or bat, but adapted to engage with the same, whereby the sheet or bat will be wound on said accumulating-roller, substantially as set forth.

31. The combination of a cotton-press for making cylindrical bales, said press receiving a continuous sheet or bat from a condenser, and an accumulating-roller between said press and condenser, normally out of engagement with said sheet or bat, but adapted to engage with the same, whereby the sheet or bat will be wound on said accumulating-roller, said accumulating-roller being reversible, whereby the cotton accumulating thereon may be unwound into the press, substantially as set forth.

32. The combination of a cotton-press for making cylindrical bales, said press receiving a continuous sheet or bat from a condenser, compression-rolls for tightly compressing the bat, and an accumulating-roller between said compression-rolls and the baling devices, normally out of engagement with said sheet or bat, but adapted to engage with the same, whereby the sheet or bat will be wound on said accumulating-roller, said accumulating-roller being reversible, whereby the cotton accumulating thereon may be unwound into the press, substantially as set forth.

33. The combination of a cotton-press for making cylindrical bales, said press receiving a continuous sheet or bat from a condenser, compression-rolls for tightly compressing the bat, and a reversible accumulating-roller between said compression-rolls and the baling devices, normally out of engagement with said sheet or bat, but adapted to engage with the same, whereby the sheet or bat will be wound on said accumulating-roller, said accumulating-roller being reversible, whereby the cotton accumulating thereon may be unwound into the press, substantially as set forth.

34. The combination of a cotton-press for making cylindrical bales, said press receiving a continuous sheet or bat from a condenser, and an accumulating-roller mounted in swinging arms, normally out of engagement with said sheet or bat, but adapted to engage with the same, whereby the sheet or bat will be wound on said accumulating-roller, substantially as set forth.

35. The combination of a cotton-press for making cylindrical bales, said press receiving a continuous sheet or bat from a condenser, and an accumulating-roller mounted in open bearings in swinging arms, normally out of engagement with said sheet or bat, but adapted to engage with the same, whereby the sheet or bat will be wound on said accumulating-roller, substantially as set forth.

36. In a cotton-press for making cylindrical bales, the combination of a core, an endless compression-belt a portion of which is formed into a loop or bight which partially encircles said core and the bale forming thereon, two or more baling-rolls working in slotted bearings and adapted to be engaged by said loop or bight as the bale enlarges; and means independent of said belt for resisting the outward movement of said baling-rolls, whereby pressure will be applied to the bale, substantially as set forth.

37. In a cotton-press for making cylindrical bales, the combination of a core, an endless compression-belt, a portion of which is formed into a loop or bight which partially encircles said core and the bale forming thereon, two or more baling-rolls working in slotted bearings for applying pressure to the bale, mechanism operated from the press for withdrawing the core from the bale, and means for opening the said loop or bight for the removal of the finished bale, substantially as set forth.

38. In a cotton-press for making cylindrical bales, the combination of a core, an endless compression-belt, a portion of which is formed into a loop or bight which partially encircles said core and the bale forming thereon, two or more baling-rolls working in slotted bearings for applying pressure to the bale, means for withdrawing the core from the bale, means for returning said core when the bale is removed, and means for opening said loop or bight for the removal of the finished bale, substantially as set forth.

39. In a cotton-press for making cylindrical bales, the combination of a core, an endless compression-belt, a portion of which is formed into a loop or bight which partially encircles said core and the bale forming thereon, two or more baling-rolls working in slotted bearings for applying pressure to the bale, means for withdrawing the core from the bale, means operated by hand for returning said core when the bale is removed, and means for opening said loop or bight for the removal of the finished bale, substantially as set forth.

40. In a cotton-press for making cylindrical bales, the combination of a fixed core, two or more baling-rolls movable toward and away from said core, and means connected with the journals of said baling-rolls for applying pressure to said baling-rolls, substantially as set forth.

41. In a cotton-press for making cylindrical bales, the combination of a fixed core, two or more baling-rolls movable toward and away from said core, and means connected with the journals of said baling-rolls for applying a gradually-increasing pressure to said baling-rolls, substantially as set forth.

42. In a cotton-press for making cylindrical bales, the combination of a fixed core, two or more baling-rolls movable toward and away from said core, means for preventing expansion of the bale between said rolls, and means connected with the journals of said baling-rolls for applying pressure to said baling-rolls, substantially as set forth.

43. In a cotton-press for making cylindrical bales, the combination of a fixed core, two or more baling-rolls movable toward and away from said core, means for applying pressure to said baling-rolls, mechanism operated by the press for withdrawing said core, and mechanism operated by hand for returning said core after the finished bale has been removed from the press, substantially as set forth.

44. In a cotton-press for making cylindrical bales, the combination of means for supplying a sheet or bat of cotton to the same, a baling-roll movable outward with the enlarging bale and movable downwardly when the bale is to be removed, a second baling-roll between which and the first baling-roll the bale is formed, and a pressure device connected with the journals of said baling-rolls, substantially as set forth.

45. In a cotton-press for making cylindrical bales, the combination of means for supplying a sheet or bat of cotton to the same, two baling-rolls for effecting pressure on the bale, said baling-rolls being movable outward as the bale enlarges, and one of said baling-rolls being movable out of the plane of the bale when the bale is to be removed, a brake-wheel to which a resistance is applied, and connections between said brake-wheel and said baling-rolls, substantially as set forth.

46. In a cotton-press for making cylindrical bales, the combination of a core on which the bale is formed, two baling-rolls for effecting pressure on the bale, said baling-rolls being movable outward as the bale enlarges, and one of said baling-rolls being movable out of the plane of the bale when the bale is to be removed, a brake-wheel to which a resistance is applied; and connections between said brake-wheel and said baling-rolls, substantially as set forth.

47. In a cotton-press for making cylindrical bales, the combination of a core on which the bale is formed, two baling-rolls for effecting pressure on the bale, said baling-rolls being movable outward as the bale enlarges, and one of said baling-rolls being movable out of the plane of the bale when the bale is to be removed, and means for withdrawing the core from the finished bale, substantially as set forth.

48. In a cotton-press for making cylindrical bales, the combination of a core on which the bale is formed, two baling-rolls for effecting pressure on the bale, said baling-rolls being movable outward as the bale enlarges, and one of said baling-rolls being movable out of the plane of the bale when the bale is to be removed, and means operated from the press for withdrawing the core from the finished bale, substantially as set forth.

49. In a cotton-press for making cylindrical bales, the combination of a core; two or more baling-rolls movable toward and away from said core; a rack at each side of the machine with which said baling-rolls are connected; and means for resisting the upward movement of said rack, whereby equal pressure will be applied to the bale by each of said baling-rolls, substantially as set forth.

50. In a cotton-press for making cylindrical bales, the combination of a core; a core-rack swiveled to said core; mechanism engaging the said core-rack for withdrawing the core from the bale; and means for applying pressure to the bale, substantially as set forth.

51. In a cotton-press for making cylindrical bales, the combination of a core; a core-rack swiveled to the same; a counterbalancing-weight for said core; means for withdrawing the core from the bale and for returning the core to its proper position; and means for applying pressure to the bale, substantially as set forth.

52. In a cotton-press for making cylindrical bales, the combination of a core, a core-rack swiveled to the same; a counterbalancing-weight for said core, means operated from the press for withdrawing said core from the bale, mechanism operated by hand for returning said core to its proper position; and means for applying pressure to the bale, substantially as set forth.

53. In a cotton-press for making cylindrical bales, the combination of the side frames, a main shaft mounted between said frames; mechanism operated by said main shaft for withdrawing the core from the bale, and a hand-wheel connected with said core for returning it to its proper position, substantially as set forth.

54. In a cotton-press for making cylindrical bales, the combination of the side frames; a main shaft 13 mounted in said frames; a core carried in said frames; a supporting-frame bolted to one of said frames; a shaft 90 carried in said supporting-frame; a pinion 91 on said shaft engaging with the core; a worm-wheel 92 on said shaft; and a worm 97 on the main shaft 13 in engagement with said worm-wheel, substantially as set forth.

55. In a cotton-press for making cylindrical bales, the combination of the side frames; a main shaft 13 mounted in said frames; a core carried in said frames; a supporting-frame bolted to one of said frames; a shaft 90 carried in said supporting-frame; a pinion 91 on said shaft engaging with the core; a worm-wheel 92 on said shaft; a worm 97 on the main shaft 13 engaging with said worm-wheel; and a hand-wheel 103 on said shaft 90 for returning the core to its original position, substantially as set forth.

56. In a cotton-press for making cylindrical bales, the combination of the side frames; a main shaft 13 mounted in said frames; a core carried in said side frames; a supporting-frame bolted to one of said side frames; a shaft 90 carried in said supporting-frame; a pinion 91 on said shaft engaging with the core; a worm-wheel 92 on said shaft; a worm 97 on the main shaft engaging with said worm-wheel; a hand-wheel 103 on said shaft 90 for returning the core to its original position; a drum 98 on said shaft 90; a cable 99 engaging with said drum; and a counterbalancing-weight 102 on said cable, substantially as set forth.

57. The combination with a press for making cylindrical cotton-bales, of the roller 17 above the same over which the sheet or bat passes from the condenser; and an accumulator-roller 42 out of engagement with the sheet or bat, but adapted to be brought down into engagement with the same when desired, substantially as set forth.

58. The combination with a press for making cylindrical cotton-bales, of a roller 17 over which the sheet or bat passes from the condenser; swinging arms 40 pivoted to the frame of the machine and having open bearings 41 at the lower ends thereof; and an accumulator-roller 42 provided with teeth or pins on its periphery and carried in said open bearings normally out of engagement with the sheet or bat, but adapted to be brought into engagement with the same when desired, substantially as set forth.

In testimony whereof I affix my signature in presence of two witnesses.

WILLIAM EMMET ANDERSON.

Witnesses:
 ARCHIE G. REESE,
 FRANK L. DYER.